United States Patent [19]

Hayashida

[11] 4,348,866  
[45] Sep. 14, 1982

[54] MASTER CYLINDER

[75] Inventor: Yoshihiro Hayashida, Chigasaki, Japan

[73] Assignee: Tokico Ltd., Kanagawa, Japan

[21] Appl. No.: 127,062

[22] Filed: Mar. 4, 1980

Related U.S. Application Data

[63] Continuation of Ser. No. 828,844, Aug. 29, 1977, abandoned.

[30] Foreign Application Priority Data

Sep. 4, 1976 [JP] Japan ................................. 51-106061  
Sep. 4, 1976 [JP] Japan ................................. 51-106062

[51] Int. Cl.$^3$ ............................................ B60T 11/06  
[52] U.S. Cl. ........................................ 60/561; 60/581; 60/588  
[58] Field of Search ................. 60/561, 581, 588, 592, 60/562

[56] References Cited

U.S. PATENT DOCUMENTS

| 2,156,205 | 4/1939 | Swift | 60/588 |
| 3,415,060 | 12/1968 | Belart | 60/561 |
| 3,423,939 | 1/1969 | Lewis | 60/588 |
| 3,461,671 | 8/1969 | Venema | 60/561 |
| 3,486,337 | 12/1969 | Tenniswood | 60/561 |
| 4,074,532 | 2/1978 | Hayashida | 60/562 |

Primary Examiner—Abraham Hershkovitz  
Attorney, Agent, or Firm—Wenderoth, Lind & Ponack

[57] ABSTRACT

A master cylinder for a vehicular brake includes a cylinder closed at one end and open at the other end, a sleeve slidably received within the cylinder, a piston assembly including a pair of pistons integrally connected together, a stop on the cylinder for confining the piston assembly within the cylinder, and a spring disposed between the sleeve and piston assembly for normally biasing one end of the sleeve against the closed end of the cylinder and the piston assembly against the stop. One of the pistons and the closed end of the cylinder define a first pressure chamber therebetween and the pistons define a second pressure chamber therebetween. In operation, the sleeve is moved towards one of the pistons in response to a difference in the amount of remaining oil between the two pressure chambers against the force of the spring.

1 Claim, 3 Drawing Figures

MASTER CYLINDER

This is a continuation application of application Ser. No. 828,844, filed Aug. 29, 1977, now abandoned.

BACKGROUND OF THE INVENTION

This invention relates to a master cylinder for a vehicular brake and more particularly, to a tandem-type master cylinder for a vehicular brake.

There have been proposed and pratically employed a great variety of tandem-type master cylinders for vehicular brakes and in one of the prior art master cylinders of such type, in order to make the pressure produced by the front piston equal to that produced by the rear piston within the cylinder, an equalization cylinder is movably disposed between the pressure generation chambers associated with the two pistons to adjust the pressures within the chambers so as to equalize the pressures. However, such an equalization cylinder is adapted to move in opposite directions within the cylinder and such movement of the equalization cylinder is an oscillatory movement and is not rapid and precise. And since the equalization cylinder is adapted to move back and forth within the cylinder, the equalization cylinder should be maintained in its neutral position before the equalization cylinder is operated. Therefore, the number of parts of the master cylinder is increased and as a result, the overall length of the master cylinder becomes undesirably long.

In most of the other prior art master cylinders, as the piston advances within the cylinder, the primary cup seal provided in a front portion of the piston serves as a seal means which closes the relief port to pressurize the liquid within the pressure chamber and forces the liquid under pressure to be discharged into the brake system and the oil replenishment chamber is provided in the piston itself. In such an arrangement of the prior art master cylinder, as the piston retracts within the cylinder, the primary cup seal serves to release the oil from the oil replenishment chamber into the pressure chamber. More particularly, in such prior master cylinders, as the piston moves back and forth within the cylinder, the cup seal on the piston alternately expands and shrinks. Thus, the cup seal should be designed to have a rigidity sufficient not to be damaged when the seal passes by the relief port in its advance movement and also a flexibility sufficient to readily flex to open the relief port as the cup seal moves away from the relief port in its retraction movement. However, in designing the cup seal practically, it is impossible to perfectly meet these requirements.

Furthermore, as mentioned hereinabove, in the prior art master cylinders, since the oil replenishment chamber is provided in a reduced diameter rear portion of the piston rearwardly of the primary cup seal, the length of the piston is increased by the amount corresponding to the length of the oil replenishment chamber which is a serious obstacle in reducing the length of the overall length of the cylinder.

SUMMARY OF THE INVENTION

Therefore, the object of the present invention is to provide a novel and improved master cylinder for a vehicular brake which can effectively eliminate the disadvantages inherent in the prior art master cylinder for a vehicular brake.

In order to attain the above object according to the present invention, a sleeve is disposed within a cylinder, at least one oil replenishment chamber is provided in the outer peripheral surface of the sleeve, a piston is slidably received within the sleeve, an auxiliary port and a relief port are provided in axially spaced positions along the length of the piston and a cup seal is mounted on each of the auxiliary port and piston in such a manner that the cup seal on one of the auxiliary port and piston serves to seal the relief port and the other of the auxiliary port and piston serves to open the relief port. With this arrangement of the parts of the master cylinder, the present invention has provided a master cylinder in which the cup seals can perform their expected functions satisfactorily, the overall length of the cylinder is shorter and the cup seals have an extended service life.

The above and other objects and attendant advantages of the present invention will be more readily apparent to those skilled in the art from a reading of the following detailed description in conjunction with the accompanying drawings which show preferred embodiments of the invention for illustration purposes only, but not for limiting the scope of the same in any way.

DETAILED DESCRIPTION OF THE INVENTION

Figure 1:
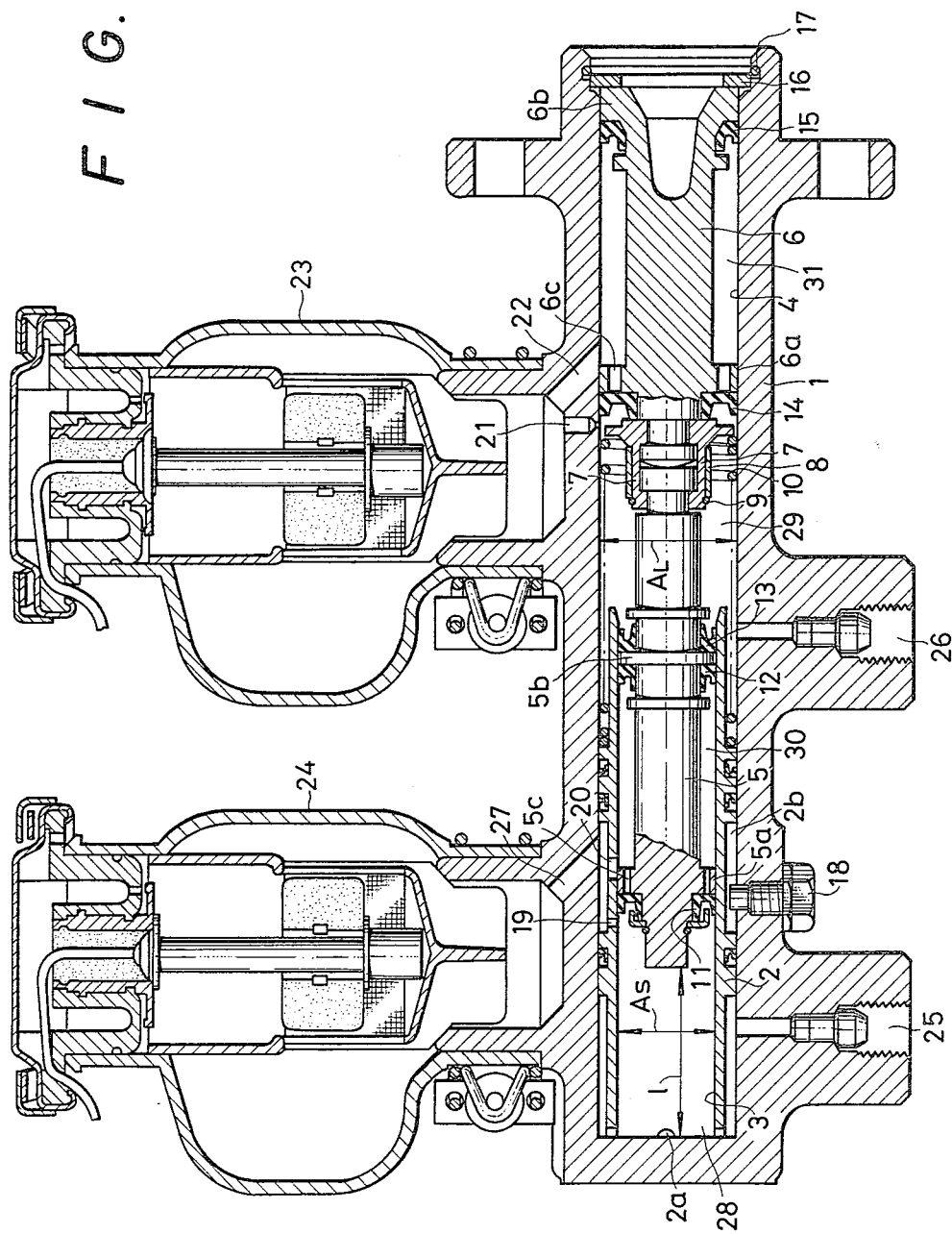
FIG. 1 is a sectional view of one preferred form of a master cylinder for a vehicular brake constructed in accordance with the present invention.

The present invention will now be described referring to the accompanying drawings and more particularly, to FIG. 1 thereof in which the first or preferred embodiment of a master cylinder for a vehicular brake of the invention is shown. The master cylinder generally comprises a cylinder body 1 which defines a cylinder 4 having a uniform diameter along the full length thereof, and the cylinder body has a pair of oil reservoirs 23, 24 mounted thereabout at axially spaced points along the length of the cylinder and in communication with the interior of the cylinder 4 from which the cylinder is filled with oil. The cylinder 4 is open at one end and closed at the other end and slidably receives a cylindrical sleeve 2 therein. The sleeve 2 has a plurality of axially spaced flanges thereabout by means of which flanges the sleeve is received within the cylinder in a liquid-tight manner and for slidable movement with respect to the cylinder body by means of a suitable conventional means (not shown). The leading end or the left-hand end of the sleeve 2 (as seen in FIG. 1) is provided with a number of notches 2a which ensure communication between the interior of the cylinder 4 and the interior of the sleeve 2 even when the leading end of the sleeve abuts against the closed end of the cylinder 4.

The sleeve 2 defines therein a smaller diameter cylinder 3 which in turn slidably receives a smaller diameter piston 5 and the piston has a front flange 5a at the leading end (the left-hand end as seen in FIG. 1) and a rear flange 5b at the rear end (the right-hand end as seen in FIG. 1) by means of which flanges the piston is received in a liquid-tight manner and for slidable movement within the smaller cylinder 3. The front flange 5a has a plurality of ports 5c extending through the flange in the axial direction thereof. In order to ensure a liquid-tight relationship between the sleeve and piston, a cup seal 11 is mounted on the left-hand side or front side of the front flange 5a surrounding the smaller diameter piston 5 and cup seals 12, 13 are mounted on the opposite sides of the rear flange 5b surrounding the smaller diameter piston 5. The cup seal 11 is held in position by means of a conventional retainer ring and clip assembly and serves as a one-way valve which blocks the oil flow from a first pressure chamber 28 defined by the closed end of the cylinder 4, the adjacent end of the smaller piston 5 and the inner surface of the sleeve 2 into a first oil replenishment chamber 30 defined by the inner surface of the sleeve 2, the outer surface of the smaller diameter piston 5 and the opposed sides of the flanges 5a, 5b, but allows the oil to flow in the reverse direction.

The rear end of the smaller diameter piston 5 is integrally connected to a larger diameter piston 6 slidably received within the cylinder 4 through a coupling means comprising split sleeves 7, 7, a cylindrical member 8 holding the split sleeves and a retainer clip 9 holding the cylindrical member 8 against slipping of the cylindrical member off the sleeves. The larger diameter piston 6 has a pair of flanges 6a and 6b at the front and rear ends or the left- and right-hand ends of the piston, and the front flange 6a is provided with ports 6c similar to the ports 5c provided in the smaller diameter piston 5. The flanges 6a, 6b have cup seals 14, 15 mounted thereon, respectively surrounding the piston 6 and the cup seal 14 is mounted on the associated flange 6a in the same manner as that in which the cup seal 11 is mounted on the flange 5a and has the same function as the cup seal 11.

Disposed within the cylinder 4 between the rearmost flange on the sleeve 2 and split sleeves 7 is a coiled spring 10 which normally biases the sleeve 2 leftwards or towards the closed end of the cylinder 4 and the piston assembly comprising the smaller and larger diameter pistons 5, 6 rightwards or towards the open end of the cylinder 4. The open end of the cylinder 4 has an annular stop 16 secured to the inner surface of the cylinder by means of a retainer ring 17 and the piston assembly normally abuts against the stop.

The cylinder body 1 has two discharge ports in axially spaced relationship along the length of the cylinder body and one of the discharge ports 25 is in communication with the first pressure chamber 28 whereas the other discharge port 26 is in communication with a second pressure chamber 29 defined by the smaller and larger diameter pistons 5, 6 and the rear flange 5b on the piston 5 within the cylinder 4. An oil sump 2b is defined by the inner surface of the cylinder 4, the outer surface of the sleeve 2 and the two adjacent flanges on the sleeve and a stop 18 extends through the wall of the cylinder body 1 into the oil sump 2b to regulate the amount of axial movement of the sleeve 2 within the cylinder 4 in the right-hand direction as seen in FIG. 1.

The sleeve 2 is further provided with a supply port 20 and a relief port 19. Supply port 20 normally communicates the oil from the oil reservoir 24 through a port 27 formed in the wall of the cylinder body 1 with the first replenishment chamber 30 and also relief port 19 is provided in a position slightly forwardly of the supply port 20 and normally communicates between the reservoir 24 and first pressure chamber 28 in a position forwardly of the front flange 5a.

The cylinder body 1 is further provided with a supply port 22 through which the oil within the oil reservoir 23 normally communicates with a second oil replenishment chamber 31 defined by the inner surface of the cylinder 4 and the outer surface of the larger diameter piston 6 between the flanges 6a, 6b on the larger diameter piston, and the reservoir 23 communicates with the second pressure chamber 29 through a relief port 21 provided in the wall of the cylinder body 1.

With the above-mentioned construction and arrangement of the parts of the master cylinder of the invention, assuming that the cross-sectional areas of the larger and smaller diameter pistons 6, 5 are defined as $A_L$, $A_S$, respectively, and the sleeve 2 is in abutment against the closed end of the cylinder 4 under the action of the spring 10, and by pressing the foot pedal down, for example, the piston assembly 5, 6 is moved leftwards against the force of the spring by the distance l, the liquid or oil within the first pressure chamber 28 is pressurized and as a result the relief port 19 is closed by the cup seal 11 and the liquid is discharged through the discharge port 25 in the amount of $Q_S$, or $(A_S \times l)$ under pressure. Similarly, as a result the relief port 21 is closed by the cup seal 14, the liquid within the second pressure chamber 29 is pressurized and discharged through the discharge port 26 in the amount of $Q_L$, or $(A_L - A_S) \times l$ under pressure. These liquids under pressure are then introduced into brake systems which are operatively connected to these discharge ports to actuate the brake systems.

After a predetermined operation has been completed, when the pedal is released, the piston assembly 5, 6 returns to its normal position under the reaction force of the spring 10 until the piston assembly abuts against the stop 16 whereupon a negative pressure generates in the pressure chambers 28, 29 to draw the oil from the brake systems back into the respective pressure chambers 28, 29. However, since it takes a rather long time for the oil to respond to the drawing-back action of the negative pressure, in order to obtain a satisfactory double-pedal depressing effect in case of emergency, for example, before the oil is completely drawn from the brake systems back into the pressure chambers 28, 29, the oil from the oil replenishment chambers 30, 31 is replenished to the pressure chambers 28, 29 through the ports 5c, 6c and cup seals 11, 14, respectively. When the amount of the oil under pressure flowing from the brake systems back into the pressure chambers 28, 29 becomes a value in excess of the capacity of the chambers, any excess oil is returned to the oil reservoirs 23, 24 through the relief ports 19, 21, respectively.

Now assuming that the oil consumption amounts within the brake systems connected to the discharge ports 25, 26 are defined as $q_S$, $q_L$, respectively, the dimensions of the larger piston and smaller piston are so selected that during normal operation the relationship $(Q_L - q_L) < (Q_S - q_S)$ is obtained. For this reason, when the pedal is actually pressed down, the remaining oil amount $(Q_S - q_S)$ within the first pressure chamber 28 becomes greater than the remaining amount $(Q_L - q_L)$ within the second pressure chamber 29 and as a result, the difference in remaining oil amount between these pressure chambers moves the sleeve 2 towards the larger diameter piston 6 against the force of the spring 10. The amount of movement of the sleeve 2 in this direction at this time is within the range of movement regulated by the stop 18. Since the front and rear flanges on the sleeve 2 have the same diameter, the pressure generated within the first pressure chamber 28 is higher than that generated within the second pressure chamber 29 by the amount of force produced by the spring (the force of the spring 10×the pressure receiving area of the sleeve 2). Therefore, in order to detect any failure in the two brake systems or to detect damage to the intermediate seal of the so-called differential valve adapted to detect any pressure loss in one of the systems for example, if it is desired to positively produce any differential pressure between the two pressure chambers 28, 29, the spring 10 should have a high rating and on the contrary, if it is not desired to produce any differential pressure between the two chambers 28, 29, the spring 10 may have a minimum rating—just enough to cause the sleeve 2 to abut against the closed end of the cylinder 4.

When and if any failure occurs in one of the two brake systems associated with the smaller diameter piston, because of an insufficient rise in pressure within the pressure chamber 28, the sleeve 2 remains in abutment against the closed end of the cylinder 4 under the force of the spring 10 and remains stationary, and only the pressure within the pressure chamber 29 rises to operate the brake system connected to the discharge port 26. On the other hand, when either one of the brake systems associated with the larger diameter piston fails, because of an insufficient rise in pressure within the pressure chamber 29, the sleeve 2 moves rightwards against the force of the spring 10 until the outermost flange on the sleeve abuts against the stop 18 and thereafter, the pressure within the pressure chamber 28 rises to operate the brake system connected to the discharge port 25.

Figure 2:
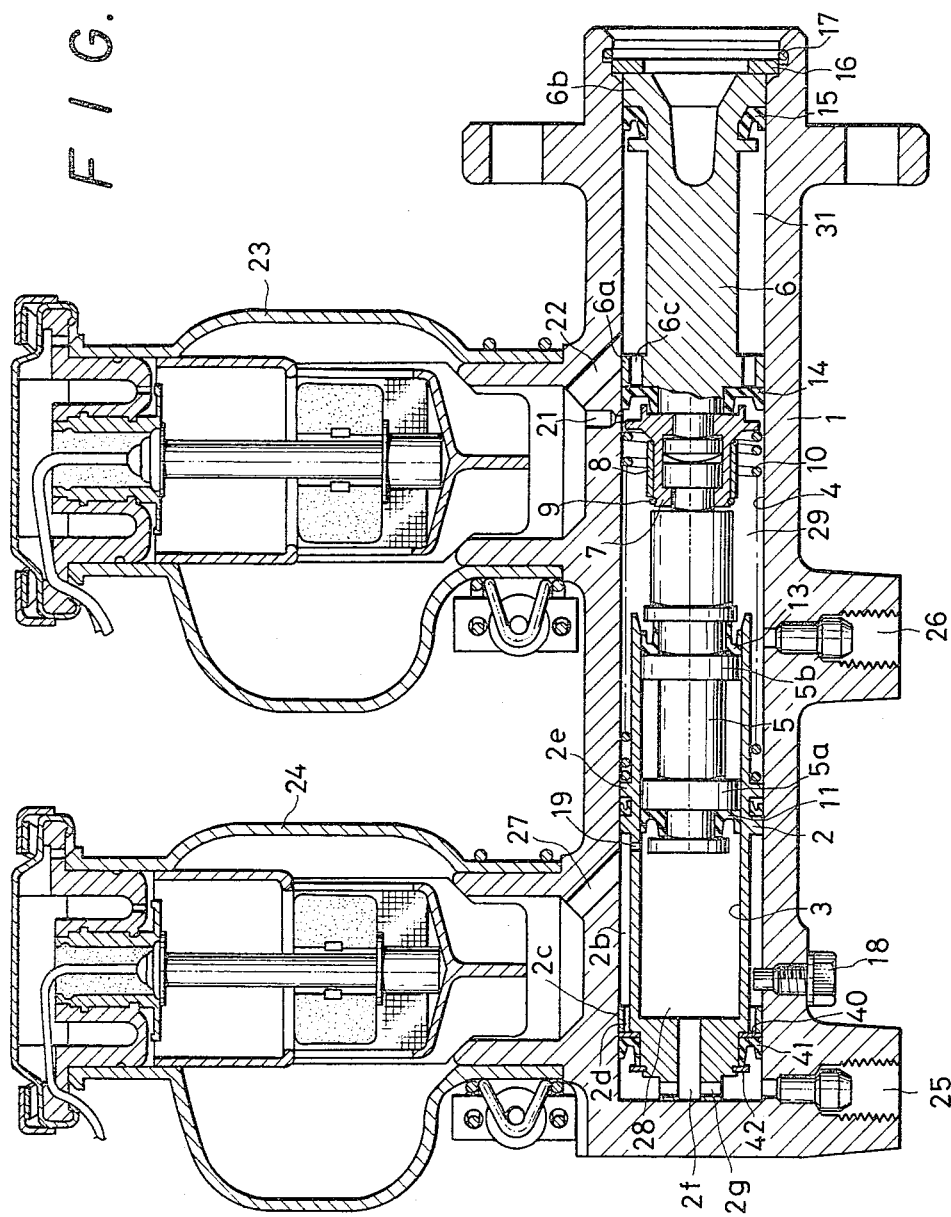
FIG. 2 is a sectional view of another embodiment of a master cylinder for a vehicular brake constructed in accordance with the present invention.

FIG. 2 shows another embodiment of a master cylinder for a vehicular brake in section. The embodiment of FIG. 2 is different from the embodiment of FIG. 1 in that the configurations of the smaller piston 5 and sleeve 2 are different from those of the corresponding parts of the first embodiment and the other parts of the second embodiment are substantially similar to the corresponding parts of the first embodiment. Thus, corresponding or similar parts are assigned the same numerals and particularly, description will be made of the smaller diameter piston and sleeve.

In the embodiment of FIG. 2, the sleeve 2 is in the form of a cylinder having one closed end and the other end open and has a projection 2c at the left-hand or front end and a second projection 2e at the right-hand or rear end in the outer periphery. The left-hand or closed end of the sleeve 2 is formed with a through center hole 2f extending in the axial direction thereof and a plurality of circumferentially spaced radial holes 2g are provided in the closed end of the sleeve in communication with the center hole 2f. The radial holes 2g have substantially the same function as the notches 2a in the sleeve 2 of the first embodiment. The front projection 2c is provided with a plurality of holes 2d extending through the projection in axial direction thereof. A spacer 40 and a cup seal 41 are mounted on the front projection 2c adjacent the left-hand ends of the axial holes 2d. The cup seal 41 is held in position by means of suitable means such as retainer rings 42. The cup seal 41 serves as a check-valve which allows the brake liquid to flow from right to left as seen in FIG. 1 and the spacer 40 prevents the cup seal 41 from entering the axial holes 2d.

An oil replenishment sump 2b is defined by the inner surface of the cylinder 4 and the outer surface of the sleeve 2 between the projections 2c, 2e and a relief port 19 is provided in the wall of the sleeve 2 in communication with the oil sump 2b. In the inoperative position of the master cylinder as shown in FIG. 2, the relief port 19 ensures that the oil from the oil reservoir 24 flows freely through the supply port 27 and oil sump 2b into the first pressure chamber 28.

The smaller diameter piston 5 has a front flange 5a and a rear flange 5b about the piston at the front and rear ends, respectively. A cup seal 11 is mounted on the left-hand side of the front flange 5a and a cup seal 13 is mounted on the right-hand side of the rear flange 5b and the cup seals extend in directly opposite directions from each other. The rear end of the smaller diameter piston 5 is connected to the front end of the larger diameter piston 6 by the same means 7, 8, 9 as shown in the first embodiment. As in the case of the first embodiment of FIG. 1, the spring 10 is disposed within the cylinder 4 between the means 7, 8, 9 and the rear projection 2e on the sleeve to normally urge the sleeve 2 and larger diameter piston away from each other so as to cause the front end of the sleeve 2 to abut against the closed end of the cylinder body 1 and the flange 6b on the larger piston 6 to abut against the stop 16 and retainer ring 17. Thus, in the embodiment of FIG. 2, the sleeve 2 is normally biased forwardly by the force of the spring 10 as in the embodiment of FIG. 1 and concurrently serves as a free piston.

In operation, in the same manner as mentioned hereinabove in connection with the embodiment of FIG. 1, when the larger diameter piston 6 and smaller diameter piston 5 are pushed into the cylinder 4 and sleeve cylinder 3, respectively by pressing the pedal down against the force of the spring 10, for example, the piston 5 operates substantially in the same manner as the corresponding part in the embodiment of FIG. 1, that is, the piston assembly 5, 6, 7, 8, 9 moves leftwards as seen in FIG. 2 and the relief port 19 is closed by the cup seal 11 to pressurize the liquid within the first pressure chamber 28 and the liquid under pressure is discharged from the first pressure chamber 28 through the holes 2f, 2g into the discharge port 25 through which the liquid is discharged into the associated brake system.

The larger diameter piston 6 which moves leftwards at this time also closes the relief port 21 by its cup seal 14 to pressurize the liquid supplied from the reservoir 23 through the relief port 21 into the second pressure chamber 29 defined by the cylinder, piston 5, sleeve 2 and larger diameter piston 6 and the liquid under pressure is discharged from the second pressure chamber 29 through the discharge port 26 into the associated brake system which in turn effects a desired braking action.

When the pedal or the like actuation member is released, the smaller diameter piston 5 and larger diameter piston 6 retract under the reaction force exerted by the spring 10 until the rear flange 6b on the larger diameter piston 6 abuts against the stop 16. At this time, as in the first embodiment of FIG. 1, the piston 5 receives the oil from the oil sump 2b through the holes 2d and the holes 2g, 2f provided in the sleeve 2 and any excess oil is finally returned to the sump 2b. The larger diameter piston 6 also receives the oil from the replenishment chamber 31 defined by the cylinder body 1 and larger diameter piston 6 between the front and rear flanges 6a, 6b through the port 6c and cup seal 14. Any excess oil is returned from the cylinder 4 through the relief port 21 to the reservoir 23.

In the embodiment of FIG. 2, assuming that the amount of oil to be discharged from the pressure chamber 28 associated with the smaller diameter piston 5 (the cross-sectional area of the smaller diameter piston 5×the stroke of the piston assembly) is defined as $Q_S$, the amount of oil to be discharged from the pressure chamber 29 associated with the larger diameter piston 6 (the difference in cross-sectional area between the larger and smaller diameter pistons 6, 5×the stroke of the piston assembly) is designated $Q_L$, and the amounts of oil consumption in the brake systems at the ends of the brake systems connected to the discharge ports 25, 26 are designated $q_S$, $q_L$, respectively, the dimensions of the smaller diameter piston 5 and the larger diameter piston 6 are so selected that during normal operation, the relationship $(Q_L - q_L) < (Q_S - q_S)$ is obtained. Therefore, when the pedal is actually pressed down, the amount of oil remaining within the pressure chamber 28 $(Q_S - q_S)$ is greater than the amount of oil remaining within the pressure chamber 29 $(Q_L - q_L)$, the sleeve 2 is moved towards the larger diameter piston 6 by the difference in remaining oil amount against the force of the spring 10. Thus, the sleeve can serve as a free piston. Furthermore, when any failure occurs in the system associated with the larger diameter piston 6, if the larger and smaller diameter pistons 6, 5 move leftwards, in spite of the fact that the pressure does not increase within the pressure chamber 29, the pressure increases within the pressure chamber 28 and as a result, the sleeve 2 is moved rightwards or towards the pressure chamber 29. It is apparent that if the sleeve 2 moves rightwards freely or without any restriction, the brake fails to operate satisfactorily. Therefore, according to the present invention, a stop 18 is provided in the wall of the cylinder body 1 extending through the wall of the cylinder body 1 into the cylinder 4 and the stop is adapted to engage the projection 2c on the sleeve or free piston 2 when the sleeve moves too for rightwards as a result of any failure of the system associated with the larger diameter piston 6 to limit the movement amount of the sleeve 2 whereby at least the brake system in communication with the pressure chamber 28 can function properly and thus, the provision of the stop 18 ensures that the brake can function without any difficulty. With the arrangement, the sleeve can function as a free piston to maintain proper balance between the two brake systems and the brake will not lose all its braking function even when either one of the brake systems fails to function.

Figure 3:
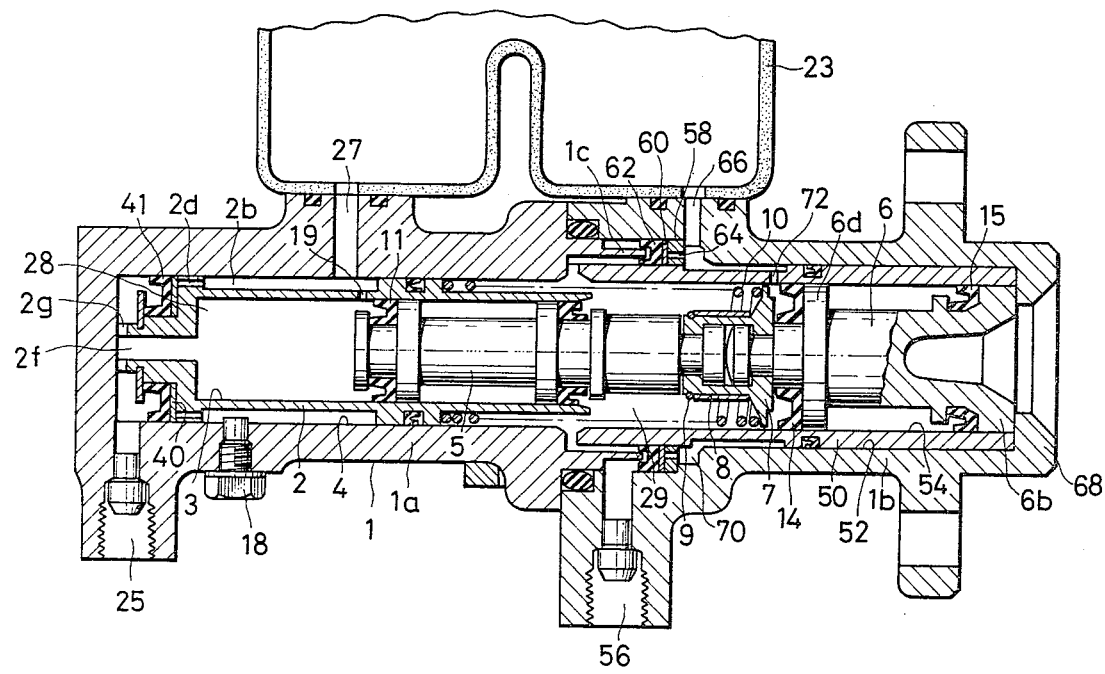
FIG. 3 is a sectional view of another embodiment of a master cylinder for a vehicular brake constructed in accordance with the present invention.

FIG. 3 shows another embodiment of master cylinder for a vehicular brake constructed in accordance with the present invention and the master cylinder of FIG. 3 is a tandem-type master cylinder similar to the embodiment of FIG. 2.

The embodiment of FIG. 3 has substantially the same function as the embodiments of FIGS. 1 and 2, but is different from the foregoing embodiments with respect to arrangement. The embodiment of FIG. 3 is different from the embodiments of FIGS. 1 and 2 in that the larger diameter piston moves slidably within a second sleeve which is provided within the cylinder. The parts or portions of the embodiment of FIG. 3 which have the same or similar functions as the corresponding parts or portions of the foregoing embodiments are assigned similar numerals thereto.

Referring to FIG. 3, the cylinder body 1 comprises a first or smaller diameter cylinder 1a and a second or larger diameter cylinder 1b. The first cylinder 1a receives a sleeve 2 which in turn receives a smaller diameter piston 5 for slidable movement along the inner surface 3 of the sleeve and the second cylinder 1b receives a sleeve 50 which in turn receives a larger diameter piston 6 for slidable movement along the inner surface 54 of the sleeve 50. The second cylinder 1b is provided with a discharge port 56 the function of which is similar to that of the corresponding port 26 in any one of the foregoing embodiments. The second cylinder 1b also has a check valve mechanism about the larger diameter sleeve 50 and the check valve mechanism comprises a radially and outwardly extending projection 58 formed integrally with or separately from the larger sleeve 50, a spacer 60 mounted above the sleeve 50 on the front or left-hand side of the projection 58 and a cup seal 62 positioned about the sleeve on the front or left-hand side of the spacer 60. The seal 62 is held in position by means of a radially and outwardly extending projection 1c on the first cylinder 1a and functions as a check valve to allow the oil from the oil reservoir 23 to flow through a plurality of axially extending through-holes 64 in the projection 58 only in the left-hand direction. The check valve corresponds to the flange-port-cup seal assembly 6a, 6c, 14 in the first and second embodiments.

The second cylinder 1b is further provided with a supply port 66 for receiving the oil from the oil reservoir 23 and a flange 68 against which the rear edge of the larger diameter sleeve 50 abuts. Defined about the larger diameter sleeve 50 in direct communication with the supply port 66 is an oil sump 70 which is in turn in communication with the interior of the larger diameter cylinder 50 through a relief port 72 provided in the larger diameter cylinder 50.

The larger diameter piston 6 has a radially and outwardly extending flange 6d at the front or left-hand end thereof and the flange 6d is provided with a plurality of ports similar to the corresponding ports of the foregoing embodiments of FIGS. 1 and 2. The piston 6 further has a radially and outwardly extending flange 6b at the rear end and the flange normally abuts against the flange 68 on the second cylinder 1b. The front or left-hand portion of the larger diameter piston 6 is connected to the rear or right-hand portion of the smaller diameter piston 5 by means of a sleeve 7 or a like means as in the foregoing embodiments.

In the embodiment of FIG. 3, when the larger diameter piston 6 and smaller diameter piston 5 are pushed leftwards (as seen in FIG. 3) into the sleeve 50 and sleeve cylinder 3, respectively against the force of the spring 10 by pressing the pedal down, for example, the piston assembly 5, 6, 7, 8, 9 moves leftwards until the relief port 19 is closed by the cup seal 11 whereupon the liquid within the first pressure chamber 28 is pressurized and the liquid under pressure is discharged from the chamber 28 through the holes 2f, 2g into the discharge port 25.

During the leftward movement of the piston assembly 5, 6, 7, 8, 9 as mentioned hereinabove, the cup seal 14 on the larger diameter piston 6 closes the relief port 72 in the cylinder 50 whereupon the liquid which was supplied from the oil reservoir 23 through the supply port 66, oil sump 70 and relief port 72 into the second pressure chamber 29 is pressurized and the liquid under pressure is discharged from the second pressure chamber 29 through the discharge port 56 into the associated brake system which in turns performs a predetermined braking action.

When the pedal is released, the two pistons 5, 6 retract against the force of the spring 10 until the rear flange 6b abuts against the flange 68. As the smaller piston 5 retracts or moves rightwards, the piston develops a negative pressure within the first pressure chamber 28 to draw the oil from the associated brake system and oil sump 2b through the discharge port 25, port 2d and holes 2g, 2f back into the pressure chamber 28. Any excess oil is finally returned to the oil sump 2b. On the other hand, as the larger diameter piston 6 retracts or moves leftwards, a negative pressure develops in the second pressure chamber 29 to draw the oil from the associated brake system and oil sump 70 through the discharge port 56 and holes 64 back into the second pressure chamber 29. Any excess oil is finally returned through the relief port 72 into the oil sump 70. Other operative functions of the embodiment of FIG. 3 are similar to the corresponding functions of the embodiment of FIG. 2.

As mentioned hereinabove, according to the present invention, since the difference between the amount of oil fed from the pressure chamber and the amount of oil consumed in the brake system associated with the larger diameter piston is smaller than the difference between the amount of oil fed from the pressure chamber and the amount of oil consumed in the brake system associated with the smaller diameter piston, a prompt and precise pressure equilibrium can be attained by the fact that the sleeve which acts as a free piston moves in only one direction. And since the sleeve is integrally incorporated into the cylinder, the master cylinder can be easily produced at less expense. Furthermore, by the provision of the spring between the sleeve and larger diameter piston to limit the movement of the sleeve to only one direction, the length of the master cylinder can be substantially reduced. In addition, a differential pressure is positively developed between the first and second pressure chambers by means of the spring 10 so that a trouble such as the failure of the intermediate seal of a differential valve can be easily detected.

In the master cylinder of the invention shown in FIG. 3, by the provision of the oil replenishment chambers within the cylinder, the entire length of the master cylinder can be successfully reduced to about $\frac{2}{3}-\frac{3}{4}$ that of the prior art master cylinder in which the oil replenishment chambers are provided in the piston itself. The cup seals are provided on both the sleeve and pistons, the seals provided on the reciprocally movable pistons merely function to close the relief ports to increase pressure and the seals provided on the sleeves which remain substantially stationary merely function to suck oil whereby the seals can exhibit their expected functions satisfactorily and extend their service life.

While only several embodiments of the invention have been shown and described in detail, it will be understood that the same are for illustration purpose only and not to be taken as a definition of the invention, reference being had for the purpose to the appended claims.

What is claimed is:

1. A tandem-type master cylinder for a vehicular brake comprising:
    a cylinder body having extending therethrough a uniform inner diameter bore having a first closed end and a second open end;
    a sleeve slidably received within said bore, said sleeve defining therein a small diameter cylinder portion;
    a plurality of axially spaced flanges provided on the outer surface of said sleeve;
    a piston assembly including a smaller diameter piston slidably received within said cylinder portion of said sleeve and a larger diameter piston slidably received within said bore of said cylinder body, said smaller and larger diameter pistons being rigidly connected;
    stop means within said bore adjacent said second end thereof for preventing said piston assembly from removal from said bore;
    a single spring positioned between said sleeve and said piston assembly and normally biasing a first end of said sleeve into contact with said closed first end of said bore and normally biasing said piston assembly against said stop means;
    a first oil pressure chamber defined between said smaller diameter piston and said closed first end of said bore within said bore, said first oil pressure chamber adapted to be connected to a first brake system;
    a second oil pressure chamber defined between said smaller and larger diameter pistons within said bore, said second oil pressure chamber adapted to be connected to a second brake system;
    a relief port extending radially through said sleeve;
    a supply port extending radially through said sleeve at a position axially spaced from said relief port;
    axially spaced first and second annular flanges provided on the outer surface of said smaller diameter piston;
    said first annular flange having axially extending therethrough at least one axially extending port;
    a replenishment chamber defined between the inner surface of said sleeve, said first and second annular flanges and the outer surface of said smaller diameter piston;
    an oil reservoir communicating with said replenishment chamber through said supply port;
    cup seal means mounted about said smaller diameter piston at said first annular flange for blocking said relief port and said axial port when said piston assembly moves toward said first closed end of said bore and for allowing oil to pass from said replenishment chamber through said axial port into said first oil pressure chamber when said piston assembly moves in a return direction toward said second open end of said bore;
    whereby, upon movement of said piston assembly toward said first closed end of said bore during normal operation, oil pressures within said first and second oil pressure chambers will be increased and transmitted to the first and second brake systems;
    whereby, upon movement of said piston assembly in said return direction toward said second open end of said bore during normal operation, said sleeve is moved toward said larger diameter piston against the force of said single spring solely in response to a difference in the oil pressures due to a difference in amounts of oil remaining in said first and second oil pressure chambers, and any excess oil within said first oil pressure chamber will escape therefrom by passing outwardly through said relief port; and
    stopping means, extending through said cylinder body into said bore at a position between certain of said axially spaced flanges of said sleeve, for limiting the extent of axial movement of said sleeve in a direction toward said second open end of said bore.

* * * * *